United States Patent [19]

Van Rosmalen et al.

[11] Patent Number: 5,548,114
[45] Date of Patent: Aug. 20, 1996

[54] OPTICAL SCANNING DEVICE FOR SCANNING A RECORD CARRIER WITH A SCANNING SPOT WHICH DEVIATES IN A DIRECTION TRANSVERSE TO THE SCANNING DIRECTION BY AN AMOUNT LESS THAN A TRACE PITCH BECAUSE OF VIBRATION

[75] Inventors: Gerard E. Van Rosmalen; Josephus A. H. M. Kahlman, both of Eindhoven, Netherlands

[73] Assignee: U.S. Philips Corporation, New York, N.Y.

[21] Appl. No.: 356,949

[22] Filed: Dec. 15, 1994

[30] Foreign Application Priority Data

Dec. 15, 1993 [BE] Belgium ............................ 09301395
Aug. 22, 1994 [EP] European Pat. Off. ............ 94202393

[51] Int. Cl.⁶ ........................................................ H01J 3/14
[52] U.S. Cl. ............................................ 250/236; 369/97
[58] Field of Search ............................ 250/234, 235, 250/236; 369/96, 97, 44.17, 44.18, 44.32, 44.11

[56] References Cited

U.S. PATENT DOCUMENTS 4,901,297  2/1990  Komatsu et al. .
5,171,984  12/1992 Van Rosmalen ............... 250/236
5,237,556  8/1993  Pierce .............................. 369/97

FOREIGN PATENT DOCUMENTS

0459586A1  12/1991  European Pat. Off. ......... G11B 7/08
9313522    7/1993   WIPO .
9407240    3/1994   WIPO .

Primary Examiner—Stephone Allen
Assistant Examiner—John R. Lee
Attorney, Agent, or Firm—Richard A. Weiss

[57] ABSTRACT

An optical scanning device for scanning a tape-like record carrier. The device includes an optical system for focusing a radiation beam at the record carrier, which radiation beam causes a scanning spot to occur on the record carrier. The device also includes a rotary polygon mirror which causes the scanning spot to be displaced transversely to the direction of the tape with a specific repetition rate. The tape-like record carrier is moved with a certain velocity in the longitudinal direction of the tape relative to the scanning device. In this manner, the record carrier is scanned in accordance with a track pattern formed by a longitudinal path of substantially parallel tracks which have a substantially constant track pitch and a track direction transverse to the longitudinal direction of the record carrier. During operation, vibrations occur which cause displacements to occur of the scanning spot over the recording layer transverse to the scanning direction. The relation between velocity and repetition rate is selected such that the amplitude of the displacements of the scanning spot, which displacements have a frequency exceeding the repetition rate, is smaller than the track pitch. As a result, the track pitch throughout the length of the tracks remains substantially constant without use of a controller.

20 Claims, 9 Drawing Sheets

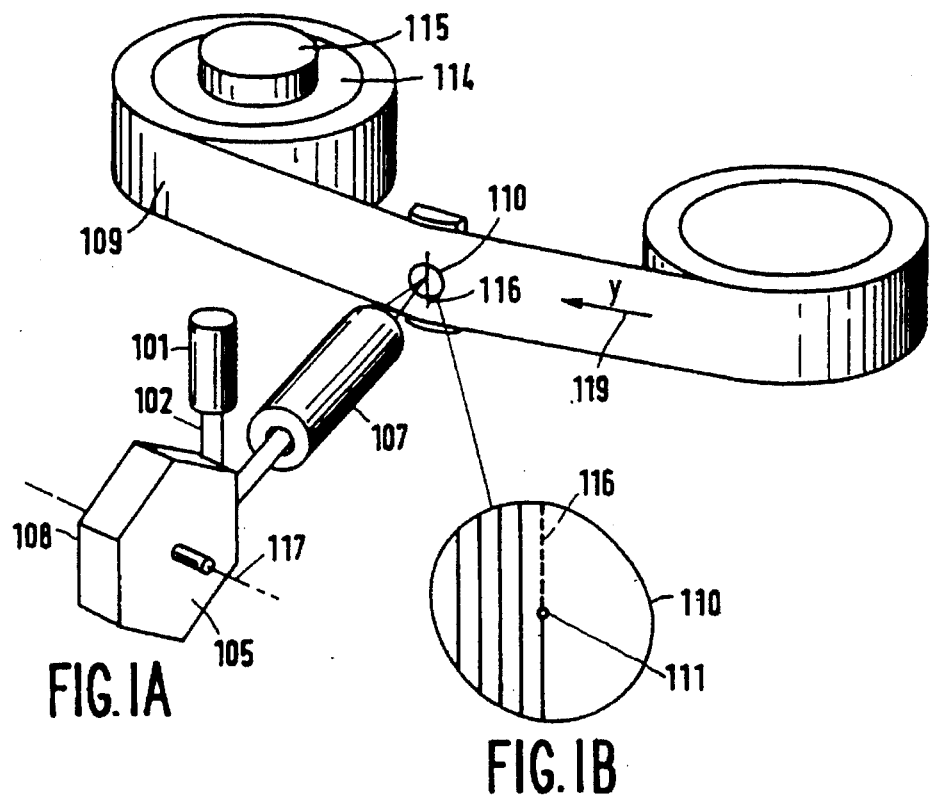
FIG.1A
FIG.1B
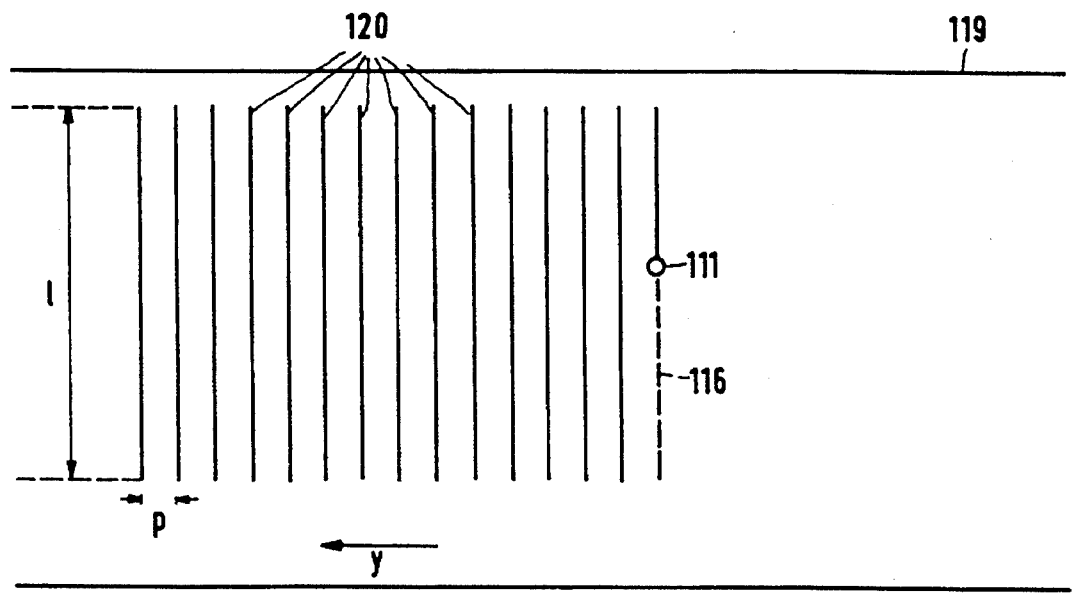
FIG.2

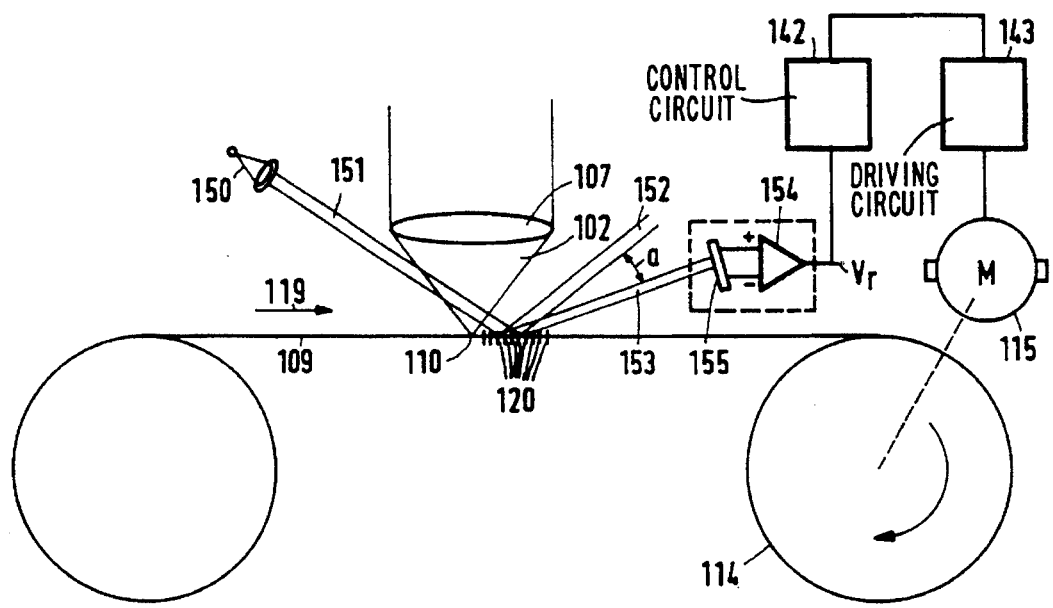
FIG.5
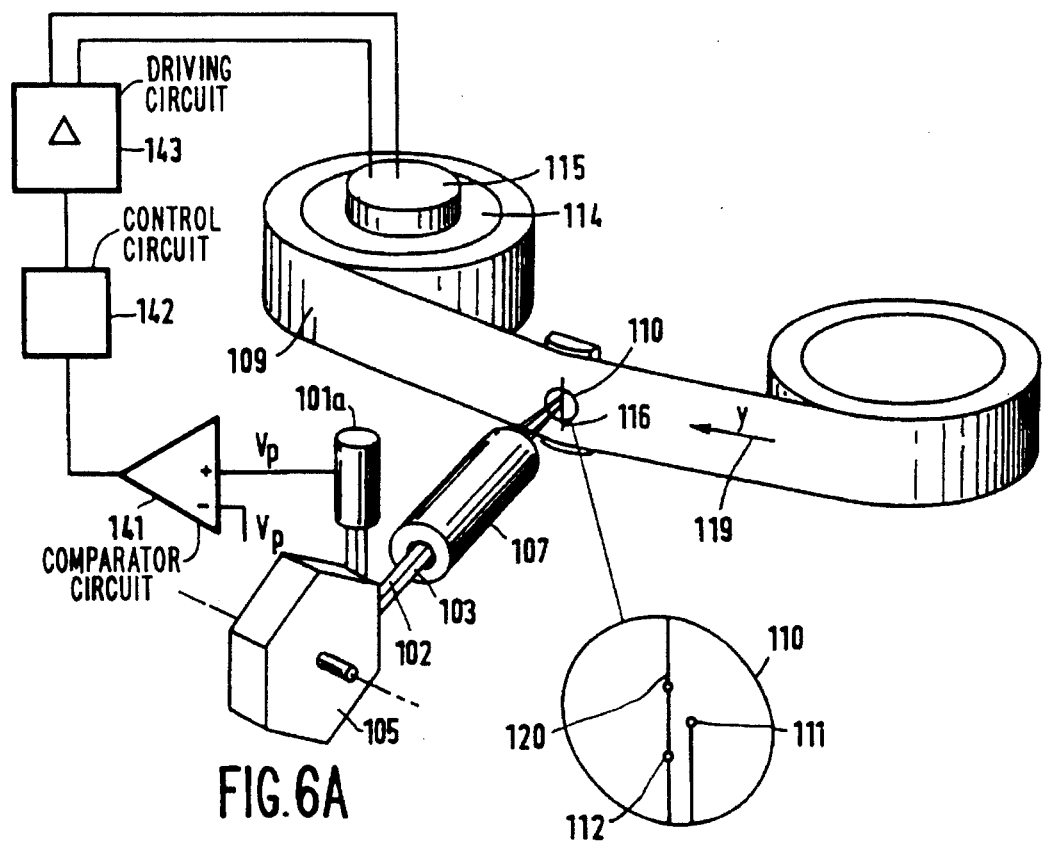
FIG.6A
FIG.6B

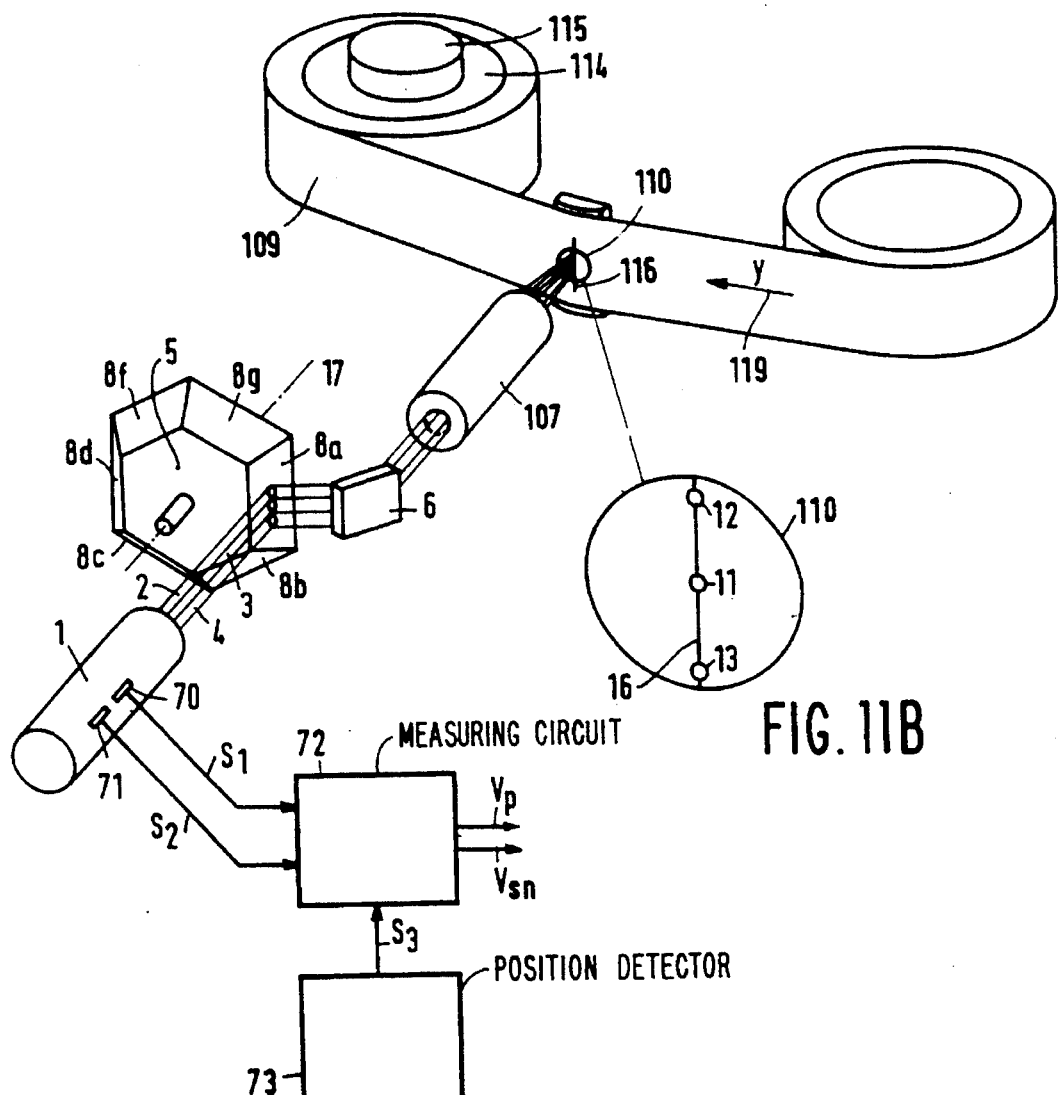
FIG. 11B
FIG. 11A
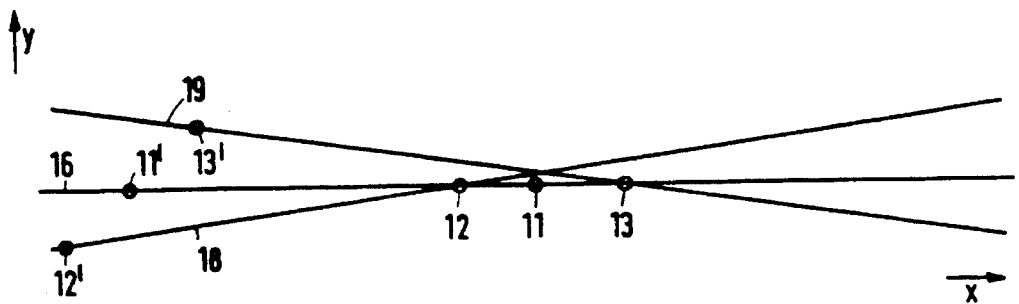
FIG. 12

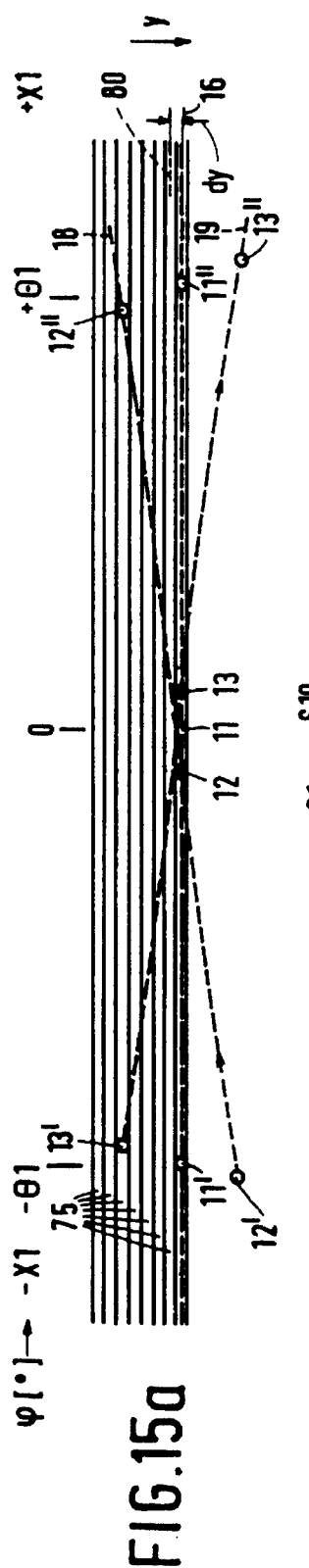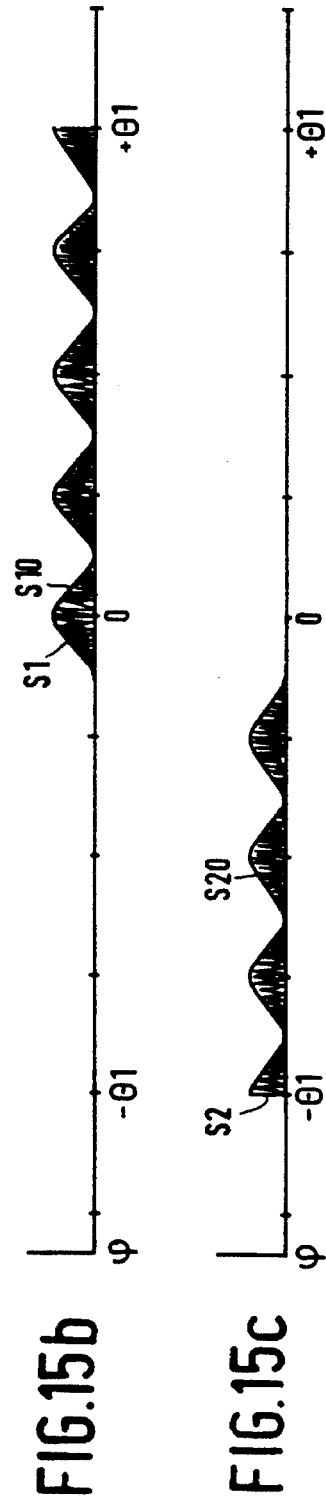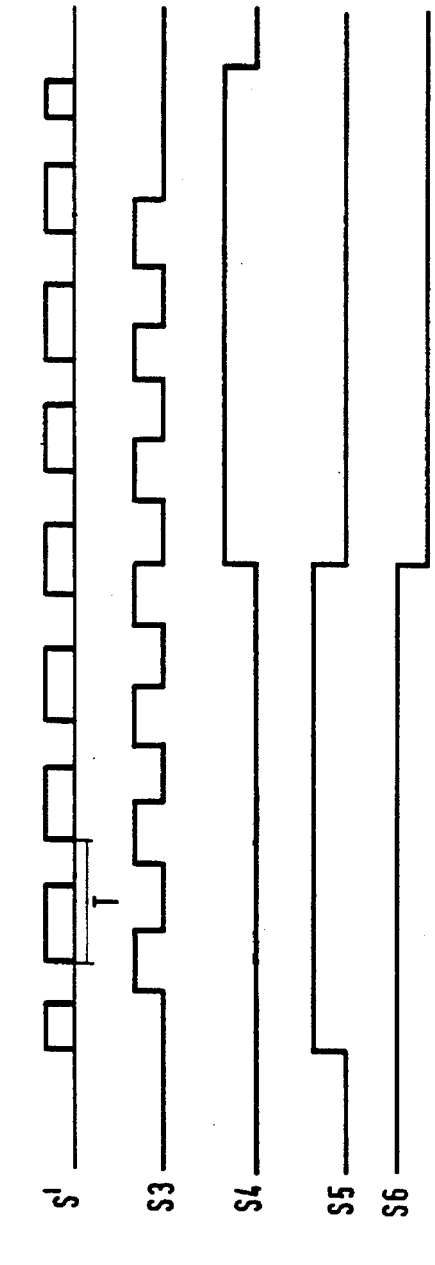

OPTICAL SCANNING DEVICE FOR SCANNING A RECORD CARRIER WITH A SCANNING SPOT WHICH DEVIATES IN A DIRECTION TRANSVERSE TO THE SCANNING DIRECTION BY AN AMOUNT LESS THAN A TRACE PITCH BECAUSE OF VIBRATION

BACKGROUND OF THE INVENTION

The invention relates to a device for scanning a layer of a medium in accordance with a track pattern formed by a longitudinal path of substantially parallel tracks which have a substantially constant track pitch and have a track direction transverse to the longitudinal direction of the path, the device comprising an optical system for focusing a radiation beam at the layer, while the radiation beam causes a scanning spot to develop on the layer, scanning means for causing the scanning spot to be displaced with a specific repetition rate over the layer along a scanning path that has a specific scanning direction, driver means for causing the medium to be displaced relative to the scanning means with a certain velocity in a direction transverse to the scanning direction, in which device, when operative, vibrations occur which cause the scanning spot to be displaced over the layer in a direction transverse to the scanning direction, which displacements of the scanning spot have an amplitude that exceeds the track pitch.

Such a device is known from U.S. Pat. No. 4,901,297. In the known device a path of parallel tracks on a tape-like record carrier is realised, which record carrier is displaced relative to an optical scanner. The optical scanner scans the record carrier repeatedly in a direction transverse to the direction of displacement of the tape-like record carrier.

For the tracking during recording the known device comprises a fine adjustment which corrects the position of the scanning spot in a direction transverse to the direction of the track in response to a detected tracking error, so that the recording scanning spot is maintained substantially in the middle of the track. During this operation the tracking error is derived with respect to a predetermined track pattern. The disadvantage of prior-art device is that a recording, during which the distance between the middles of two successive tracks (also denoted track pitch) remains substantially constant over the whole length of two successive tracks, is only possible if the record carrier used already has a prearranged track pattern.

SUMMARY OF THE INVENTION

It is an object of the invention to provide a device of the type defined in the opening paragraph in which the track pitch between successive tracks remains the same throughout the length of these tracks during recording.

The device according to the invention is thereto characterized in that the relation between velocity and repetition rate is selected such that the amplitude of the displacements of the scanning spot, which displacements have a frequency exceeding the repetition rate, is smaller than the track pitch.

In the device according to the invention the fact is advantageously utilized that the displacements of the scanning spot which are caused by annoying vibrations diminish above a certain limit frequency to values far below the track pitch.

By scanning with a frequency for which the track pitch exceeds the amplitude of the scanning spot displacements caused by the vibrations there is achieved that, seen in longitudinal direction of the track, the intertrack distance remains substantially the same without the need for readjusting the position of the scanning spot. The displacement of the scanning spot due to low-frequency vibrations which have an amplitude exceeding the track pitch by far, is uniformly distributed over a very large number of tracks and, therefore, only affect the track pitch to a very small extent.

An embodiment for the device is characterized in that the device comprises control means for controlling the velocity in dependence on a measuring signal.

This embodiment is advantageous in that the average track pitch (which is proportional to the average velocity) is constantly kept at a defined value. The velocity is preferably controlled in response to a measuring signal which is indicative of the distance between the middles of successive tracks (track pitch). An attractive embodiment for the device in which this is realised is characterized in that the electro-optical measuring means comprises an optical system for focusing a radiation beam at the track pattern, the track pattern converting the incoming radiation beam into a zero$^{th}$ order beam and first-order beams and a detection means for deriving as the measuring signal a detection signal that is indicative of the angle between the zero$^{th}$ order beam and one of the first-order beams.

A further embodiment for the device in which the velocity is controlled based upon the distance between successive tracks is characterized in that the optical means comprises means for focusing a satellite beam together with aforesaid scanning beam at the recording layer, the satellite beam causing a satellite scanning spot on the recording layer which spot is located at a predefined position relative to the former scanning spot, the electro-optical measuring means comprising a detection system for deriving the measuring signal based upon the radiation coming from the satellite scanning spot.

An embodiment for the device which is not only suitable for information recording but also for reading the recorded information is characterized by an actuator that intervenes in the optical system and causes the scanning spots to be displaced in a direction transverse to the tracks within a predefined range of displacement, and signal generating means for generating a position signal which is indicative of the position of the scanning spots in the scanned area, control means which may be brought to a first and a second state and which, in the first state, cause the velocity to be controlled in response to the measuring signal and, in the second state, cause the actuator to be controlled in response to the measuring signal and the velocity to be controlled in response to the position signal.

BRIEF DESCRIPTION OF THE DRAWINGS

Further embodiments for the device as well as advantages thereof will be further described in detail with reference to the drawing FIGS. 1 to 16, in which:

FIGS. 1, 4, 5, 6, 9 and 11 show different embodiments for the device according to the invention, FIG. 2 shows a path of parallel tracks as they are realised with the device according to the invention, FIG. 12 shows paths followed by scanning spots in the embodiment shown in FIG. 11, FIGS. 13 and 14 show different positions of the polygon mirror for the embodiment shown in FIG. 11, FIGS. 15a–15h show paths of scanning spots and associated signals as they occur in the embodiment shown in FIG. 11

FIG. 1 shows an embodiment for a scanning device according to the invention.

DESCRIPTION OF THE PREFERRED EMBODIMENTS

Figure 3:
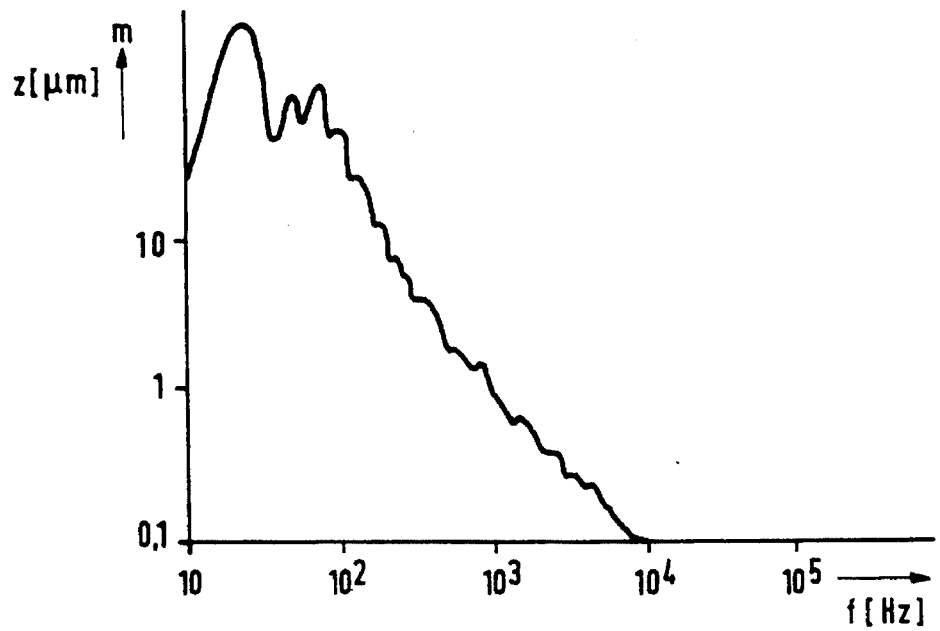
FIG. 3 shows the amplitude of the scanning spot displacements caused by vibrations plotted against frequency.

The scanning device shown comprises an optical scanning system formed by a lightwave 101, a rotary polygon mirror 105 and a focusing objective 107. The lightwave 101 may be of a type as is customarily used in optical or magneto-optical recording and/or reading devices. Such a lightwave comprises generating means for generating radiation beams 102. The radiation beam 102 is focused via the polygon mirror 105 and the focusing objective 107 at a layer of the tape-like medium 109, for example a record carrier having a radiation-sensitive recording layer which layer undergoes an optically detectable change under the influence of the radiation coming from the radiation beam 102. This recording layer may be of a magneto-optical or optical type. The radiation beams 102 are focused by the focusing objective 107 to a very small scanning spot 111 on the recording layer of the record carrier 109. An area 110 on the recording surface where the radiation beam 102 hits the recording layer is shown in detail. In the area 110 shown in detail the scanning spot 111 shown is caused by the radiation beam 102.

The polygon mirror 105 has reflecting facets 108 and is rotated around an axis 117 by customary driving means (not shown) which are extensively described, for example, in U.S. Pat. No. 5,171,984 and European Patent Application 0 459 586, which documents are deemed incorporated herein by reference. The polygon mirror 105 is positioned relative to the lightwave 101 so that, on rotation of the polygon mirror 105 around the axis of rotation 117, always a next facet of the facets 108 is hit by the radiation beam 102, so that the recording layer is recurrently scanned by the scanning spot 111 and the scanning spot 111 follows a scanning path 116. The repetition rate fh of the scanning along the scanning path 116 is equal to the number of revolutions per minute (r.p.m.) of the polygon mirror 105 times the number of facets 108 of the polygon mirror 105.

The embodiment shown in FIG. 1 further includes displacement means for displacing the record carrier 119 relative to the optical system with a velocity v in a direction y transverse to the direction of the scanning path 116. These displacement means may be of a customary type shown diagrammatically in FIG. 1 and comprising a reel 114 driven by a motor 115 for winding the tape-like record carrier 109 which is transported by this reel in the direction y that corresponds to a longitudinal direction of the tape-like record carrier 119. The direction y is indicated by an arrow 119 in FIG. 1.

The recording device described above realises ever successive tracks which carry effects on the scanning path 116 scanned by the scanning spot 111 on a recording layer of the record carrier 109. In this manner a pattern of parallel tracks is realised, a new track being written each time the scanning spot 111 scans the recording layer. FIG. 2 shows by way of illustration the track pattern thus obtained, the tracks being designated by reference character 120. The length of the tracks is referenced 1 and the distance between the middles of the tracks, also termed track pitch, is denoted p. With a given velocity v and a repetition rate fh the track pitch is equal to v/fh.

If the device shown in FIG. 1 is in operation, there will be oscillations due to, among other things, the drive of the record carrier 109, which oscillations cause displacements to occur of the recording layer 111 underneath the scanning spot 111. Especially displacements in the direction transverse to the tracks 120 are detrimental, because they affect the track pitch of successive tracks 120. The displacement of the scanning spot due to these oscillations is therefore to be smaller than the track pitch. The disturbance of the track pitch of successive tracks 120 is exclusively caused by oscillations having frequencies of which the values are of the order of the repetition rate fh or higher than this repetition rate.

FIG. 3 shows by way of illustration for a customary combination of driving mechanism and polygon scanner, the amplitude z of the displacement of the scanning spot 111 caused by vibrations plotted against frequency.

As appears from FIG. 3 the amplitude strongly decreases with high frequencies. With frequencies exceeding 10 kHz the amplitude has dropped to values below 0.1 micrometer.

With a customary track pitch of 1–2 micrometers, the effect of the vibrations on the track pitch between successive tracks 120 will be negligibly small in the case of repetition rates exceeding 10 kHz. If the repetition rate is selected to have an amplitude z that is small relative to the track pitch, the vibrations have only a minor effect on the distance between the successive tracks. Preferably, the repetition rate is selected to exceed a limit frequency for which the amplitude z is 20% of the track pitch. It will be evident that the effect of the vibrations decreases as the repetition rate is situated higher above this limit frequency.

If the repetition rate is selected to exceed this limit frequency, a path of parallel tracks 120 is obtained for which the distance between each pair of successive tracks remains substantially constant throughout the length of the track.

Figure 4:
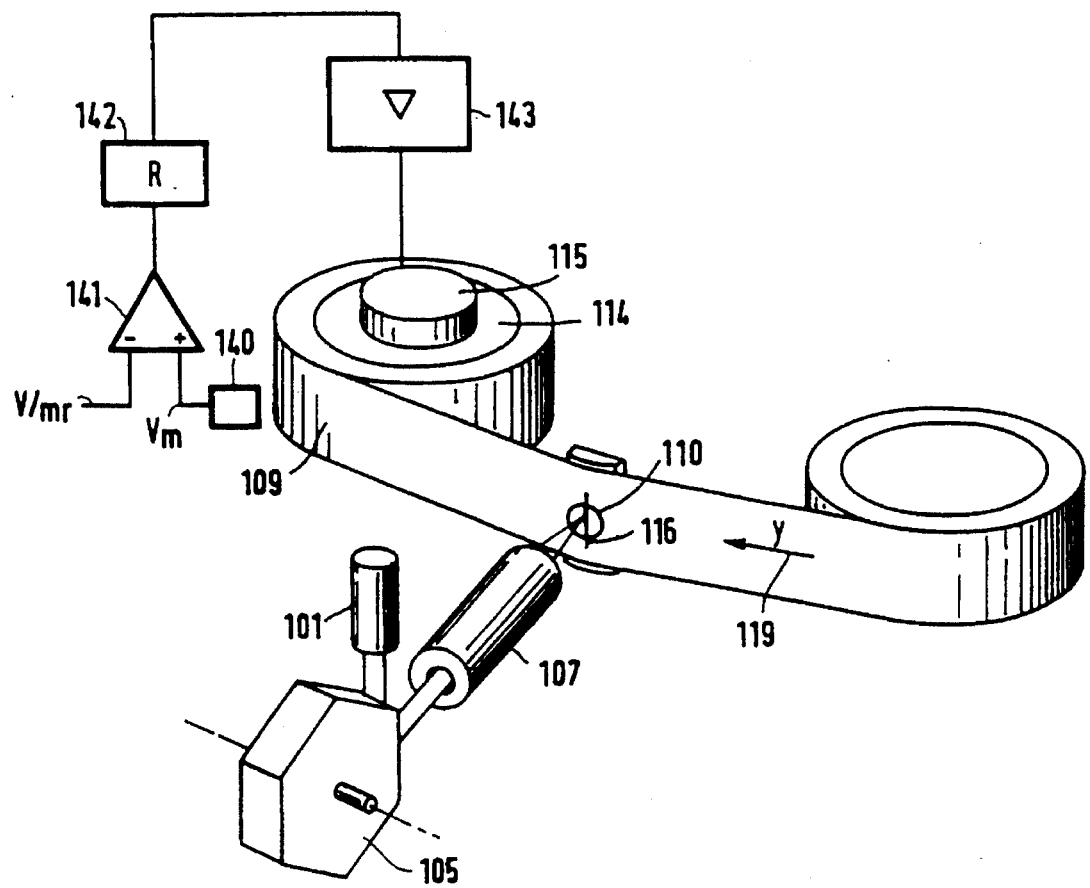

When the polygon mirror 105 is driven, the r.p.m. will generally remain constant because the operating conditions affecting the r.p.m. for the polygon mirror 105 do not vary or vary only slightly. This is in contrast to the drive of the record carrier. Albeit not necessary, preference should be given to having the record carrier drive include a feedback control for controlling the velocity v. This may be effected, for example, by deriving in customary fashion a measuring signal Vm which is inactive for the velocity v. FIG. 4 shows by way of example an embodiment in which this is realised, in which the elements corresponding to those shown in FIG. 1 carry the same reference characters. Reference character 140 denotes a tape velocity meter of a customary type for deriving the measuring signal Vm. The measuring signal is applied to a non-inverting input of a comparator circuit 141. An inverting input of the comparator circuit 141 is supplied with a reference signal Vmr which indicates a desired velocity. The comparator circuit 141 applies an output signal to a control circuit 142, which output signal is indicative of the difference between the measuring signal Vm and the reference signal Vmr. An output signal of the control circuit 142 triggers a control signal for a driving circuit 143 to drive the motor 115. The control circuit 142 is one of a customary type which produces a control signal in response to the output signal of the comparator circuit 141 for which the difference between Vm and Vmr remains substantially equal to zero.

Although the embodiment shown in FIG. 4 is highly satisfactory, it is advantageous to have the velocity controlled as a function of a measuring signal Vp indicative of the track pitch in lieu of the measuring signal Vm.

For the case where the record carrier 109 is of a type in which the scanner records tracks showing a regular structure, FIG. 5 shows an embodiment in which the velocity of the record carrier 109 is controlled in response to the measuring signal Vp.

FIG. 5 shows the pans shown in the previously described FIGS. 1 and 4 again designated by like reference characters. To derive the measuring signal Vp, the device comprises a light source 150 which is, for example, a semiconductor laser for generating a radiation beam 151. The radiation beam 151 is focused at the track pattern formed by the tracks 120, which pattern is at a short distance from the location where the scanning spot 110 recurrently scans the recording layer 109. As a result of the regular structure formed by the track pattern, the radiation beam 150 incident on the track pattern is converted into a reflected zero$^{th}$ order beam 152 and higher-order beams. From these higher-order beams there is shown only a first-order beam 153. The size of the angle a between the n$^{th}$ order beam 152 and the first-order beam 153 depends on the track pitch of the tracks 120. By means of a radiation-sensitive detector 154 a signal is derived which denotes how much angle a deviates from the angle of the desired track pitch. The radiation-sensitive detector 154 is one of a customary type producing a signal that denotes the deviation between the middle of a radiation-sensitive surface 155 and the spot where the radiation beam is incident on the radiation-sensitive surface 155. The radiation-sensitive detector is arranged in such a way that in the case where the angle a corresponds to the desired angle, the first-order beam hits the radiation-sensitive surface 155 of the detector 154 in the middle.

The output signal of the detector 154 is always indicative of a deviation between the real track pitch of the tracks 120 and the desired track pitch. For that matter, this output signal is used as the measuring signal Vp. The measuring signal Vp is applied to the control circuit 142 which, in dependence on this measuring signal Vp, derives the control signal by which the velocity is maintained at a value for which the track pitch between the tracks is kept equal to the desired track pitch.

FIG. 6 shows an embodiment in which the signal Vp is derived in a different manner. In this drawing Figure the parts corresponding to those shown in the other drawing Figures are again designated by like reference characters.

Figure 7:
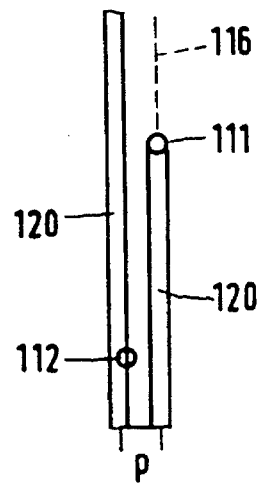
FIG. 7 shows in detail the position of the scanning spot relative to the track.
Figure 8:
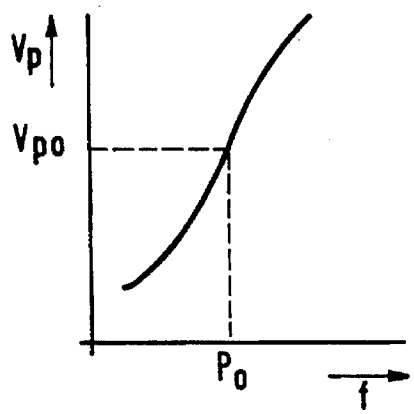
FIG. 8 shows the relation between the position of a scanning spot and a position measuring signal Vp.

In lieu of the light wave 101, the device comprises an adapted light wave 101a which generates a satellite radiation beam 103 in addition to the radiation beam 102. The satellite radiation beam 103 is also focused at the recording layer of the record carrier 109 via the objective 107 and causes a very small satellite scanning spot 112 on the recording layer of the record carrier 109. The intensity of the beam 103 is insufficient to cause a change in the recording layer. The beam 103 is focused such that with a desired track pitch of the tracks 120 the middle of the satellite scanning spot coincides with an edge of a track realised previously. By way of illustration FIG. 7 shows a position of the scanning spots 111 and 112 for the case where the spacing of two successive tracks 120 is equal to the desired track pitch. The radiation beam 103 reflected by the record carrier 109 is led back to the lightwave 101a via the focusing objective 107, in which lightwave the reflected beam is directed at a radiation-sensitive detector of a customary type which produces a detection signal indicating the power of the received radiation. The output signal of the detector functions as the signal Vp. FIG. 8 shows by way of illustration the power of the signal Vp as a function of the distance between the track instantaneously recorded by the scanning spot 111 and the adjacent track which is scanned by scanning spot 112. The signal value Vp0 corresponds to the desired distance p0. The comparator circuit 141 compares the signal Vp with a reference signal Vpr which has a signal value corresponding to Vp0. The result of the comparison is applied to the control circuit 142. The control circuit controls the velocity of the record carrier 109 to a value at which the signal Vp and the signal Vp2 substantially remain equal to each other.

Figures 9A, 9B:
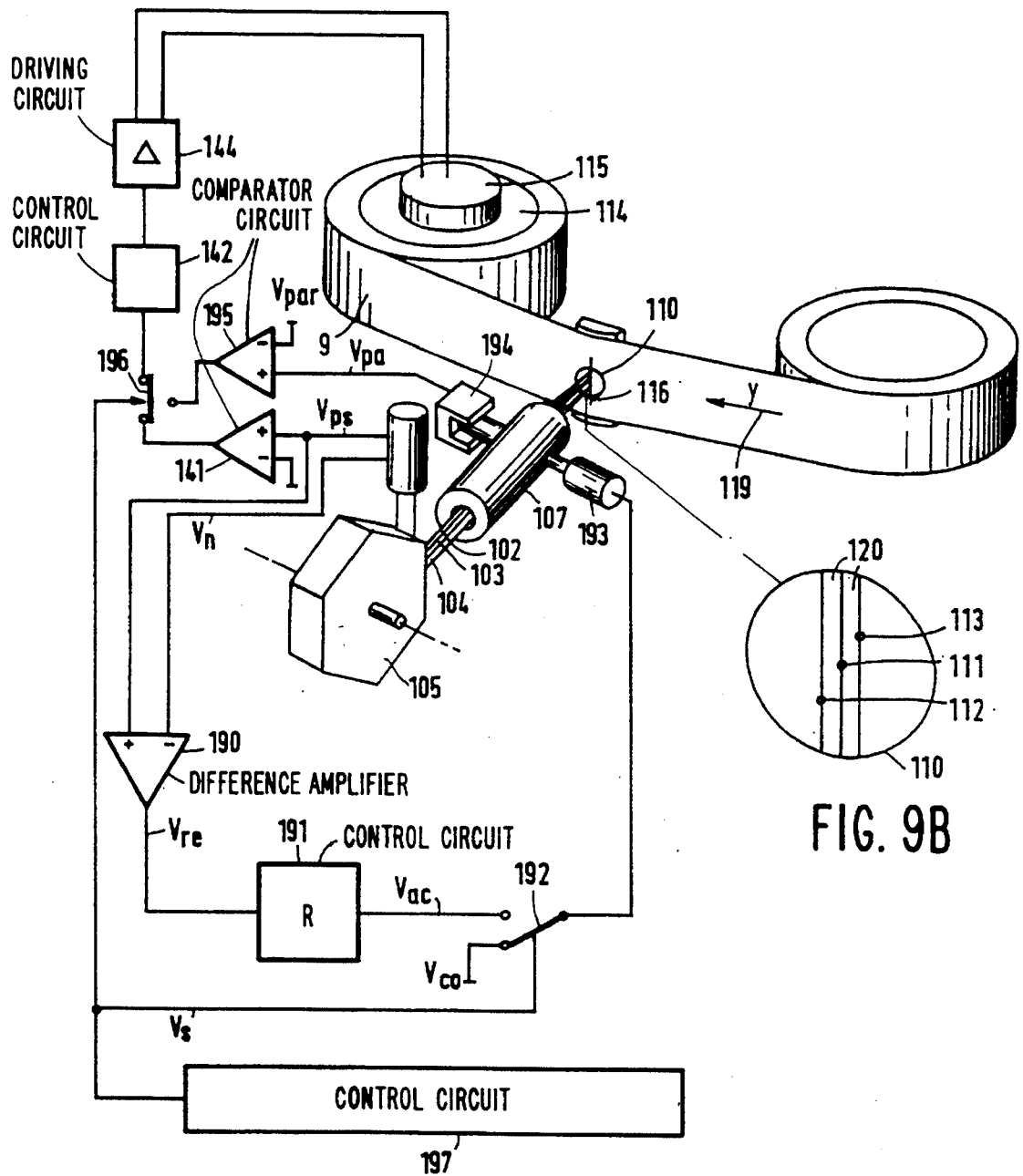

The embodiments described above are intended for recording tracks 120. FIG. 9 shows an embodiment for a device according to the invention which is suitable for both recording tracks 120 and reading the recorded tracks 120. In this drawing Figure the parts corresponding to parts in other drawing Figures are again designated by like reference characters. The device shown comprises a modified lightwave 101b which generates a second satellite radiation beam 104 in addition to the radiation beam 102 and the satellite radiation beam 103. The beams 102, 103 and 104 are focused at the recording layer of the record carrier via the focusing objective 107 while the radiation beams 102, 103 and 104 cause scanning spots 111, 112 and 113 respectively to occur. The beams 102 and 103 are focused such that the mutual positions of the radiation spots 111 and 112 are identical with the mutual positions as they occur in the device shown in FIG. 6. The radiation beam 104 is focused such that the scanning spot 113 and the scanning spot 112 caused by this radiation beam are symmetrical with the scanning spot 111.

Figure 10:
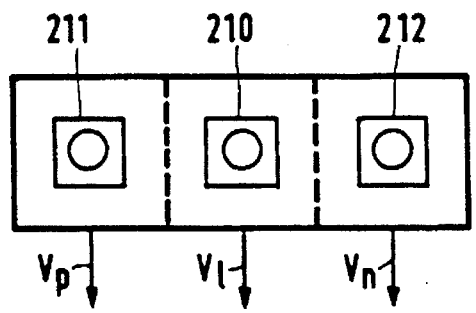
FIG. 10 shows a plan view of an optical detector.

The radiation beams 102, 103 and 104 reflected by the record carrier 109 are led back to the lightwave 101b via the focusing objective 107. In the lightwave each of these reflected beams is directed at a radiation-sensitive detector. FIG. 10 shows by way of illustration these radiation-sensitive detectors which are referenced 210, 211 and 212. The detectors are arranged such that the reflected beam 102 hits detector 210, the reflected beam 103 hits detector 211 and the reflected beam 104 hits detector 212. The detectors 210, 211 and 212 are of a customary type producing a detection signal indicative of the power of the radiation received by the detector. The signal produced by the detector 211 functions as the signal Vp. The detection signal produced by the detector 210 functions as the reading signal V1 which is indicative of information available in the track scanned at the scanning spot 111. The detection signal produced by the detector 212 is referenced signal Vn. When prerecorded tracks 120 are read out, it is possible to recover in customary fashion a tracking error signal Vre from the difference between the signal Vp and the signal Vn. Thereto the device shown comprises a difference amplifier 190. The tracking error signal Vre is applied to a control circuit 191 which measures a control signal Vac in customary fashion. The control signal Vac is applied, via a selector switch 192, to an actuator 193 which is capable, by displacing a component, in this case the focusing objective 107, of the displacement of the scanning spots 111, 112 and 113 in a direction transverse to the direction of the track within a specific limited area. The location of the scanning spots within the displacement area is determined by a position detector 194 which produces a position signal Vpa which indicates the location of the objective 107 relative to the detector 194. There should be observed that the position signal Vpa can be derived not only with the position detector but also in a different manner. For example, in the case where the objective 107 is spring suspended, the DC component of the signal applied to the actuator 193 is indicative of the location. The signal Vpa is compared by a comparator circuit 195 with a reference signal Vpar whose signal value corresponds to the positions of the scanning spots 111, 112 and 113 approximately in the middle of their displacement area.

An output signal of the comparator circuit 195, which is indicative of the difference between the signals Vpa and Vpar, is applied to the control circuit 142 via a selector switch 196. Also the output signal of the comparator circuit 141 is applied to the selector switch 196. The selector switches 192 and 196 are of a customary type which may be brought to a first or a second state in response to a control signal Vs produced by a control circuit 197. In the first state the selector switch 192 applies a signal Vco having a constant amplitude to the actuator 193. In the first state the selector switch 196 passes the output signal of the comparator signal 141 on to the control circuit 142. In the second state the selector switch 192 passes the output signal of the control circuit 191 on to the actuator 193. In the second state the selector switch 196 passes the output signal of the comparator circuit 195 on to the control circuit 142.

In the selector switches 192 and 196 are brought to the first state (the state shown), the device is in a state suitable for realising the tracks 120. This state will further be referenced writing state. The velocity control circuit formed by the components 141, 142, 144 and 115 then maintains the velocity at a value for which the track pitch corresponds to the desired value in similar manner to the circuit shown in FIG. 6. The actuator 193 is then supplied with the signal Vca having a constant signal value, so that the objective 107 continues to be in a fixed position.

If the selector switches 192 and 196 are brought to the second state, the device is in a state suitable for scanning with the scanning spot 111 prerecorded tracks 120. In this state, further to be referenced reading state, the output signal of the control circuit 191 is applied to the actuator 193. The feedback control loop formed by the components 190, 191 and 193 then functions as a position tuner which tunes the position of the objective 107 so that, in response to the tracking error signal Vre, the scanning spot 111 continues to be focused at the track to be scanned. To avoid the actuator 193 being jammed at the end of its displacement area, the velocity of the record carrier is tuned by the feedback control loop formed by the components 194, 195, 142, 144 and 115, so that the actuator 193 remains in the middle of its displacement area on average. Above velocity control loop especially reacts to low-frequency interference and therefore acts as a coarse adjustment to keep the scanning spot 111 focused approximately at the track 120 to be scanned. The position tuning especially reacts to high-frequency interference, so that with this control loop the scanning spot 111 can be held precisely on the track 120 to be scanned. Since the change of the track pitch is negligibly small in a track, the tuning need not be capable of compensating for these deviations. The upper limit frequency of the frequency control band of the tuning may then also be lower than the repetition rate fs of the scanning. When a fine adjustment (tuning) is used, by which it is impossible to compensate for interference above said repetition rate, it is advantageous not to make a fine adjustment of the position of the scanning spot during the writing state. When the tracks are realised, minor variations in the track pitch between different tracks do occur, it is true, which cannot be removed by the velocity control loop of the record carrier 109, but such variations are of minor importance. It is only important that the track pitch between two adjacent tracks remain constant. A fine adjustment which reacts to the variations of the track pitch is then redundant. Moreover, the measuring signals generally contain noise which may lead to unnecessary deviations in the track pitch.

With reference to FIGS. 11 to 16 an embodiment of the invention will be described in which the measuring signal Vp indicative of the track pitch is derived in a different manner. In these drawing Figures the components corresponding to those occurring in other drawing Figures are denoted by like reference characters.

The scanning device shown in FIG. 11 comprises an optical scanning system formed by a lightwave 1, a rotatable polygon mirror 5, a deflecting mirror 6 and the focusing objective 107. The lightwave 1 may be of a type as is customarily used in optical or magneto-optical recording and/or reading devices. Such a lightwave comprises generating means for generating radiation beams, in this case three radiation beams 2, 3 and 4, whose directions show slight mutual differences and of which two beams (2 and 4) are symmetrical with a central scanning beam (3). The scanning beams 2, 3 and 4 are focused at record carrier 109 via the polygon mirror 5, the deflecting mirror 6 and the focusing objective 107. The radiation beams 2, 3 and 4 are focused by the focusing objective 107 to very small scanning spots on the recording surface of the record carrier 109. As the directions of the three radiation beams are different, the positions of the scanning spots differ likewise. The part 110 of the recording surface where the radiation beams hit the record carrier 109 is shown enlarged. In the enlarged part 110 a first scanning spot caused by the radiation beam 3 is referenced 11. Second and third scanning spots caused by the radiation beams 2 and 4 are referenced 12 and 13, respectively.

The polygon mirror 5 has reflecting facets 8a, ..., 8g and is rotated around an axis 17 by a customary driving means (not shown), described in detail, for example, in U.S. Pat. No. 5,171,984 and EP-A-0.459.586 which documents are deemed to be incorporated herein by reference. The polygon mirror 5 is arranged relative to the lightwave 1 in such a way that when the polygon mirror 5 rotates around the axis of rotation 17, one of the facets 8a, ..., 8g is successively hit by the radiation beams 2, 3 and 4, so that a recurrent scanning of the recording surface by the scanning spots 11, 12 and 13 is realised and the scanning spots 11, 12 and 13 move synchronously over the recording surface along scanning paths 16, 18 and 19, respectively (see FIG. 12). As the radiation beams 2 and 4 are symmetrical with the radiation beam 3, the scanning spots 12 and 13 caused by the radiation beams 2 and 4 are symmetrical with the scanning spot 11 caused by the radiation beam 3.

The polygon mirror 5 has the form of a truncated pyramid whose sloping sides form the facets 8a, ..., 8g and whose axis of rotation 17 intersects the base in its middle and forms a right angle to this base. Worded differently, the facets 8a, ..., 8g form an oblique angle to the axis of rotation 17 of the polygon mirror 5. These oblique angles cause the scanning paths followed by the scanning spots 11, 12 and 13 not to be parallel, but to intersect as is represented in FIG. 12.

The cause of this will be explained hereinafter with reference to the drawing FIGS. 13 and 14.

Figure 13:
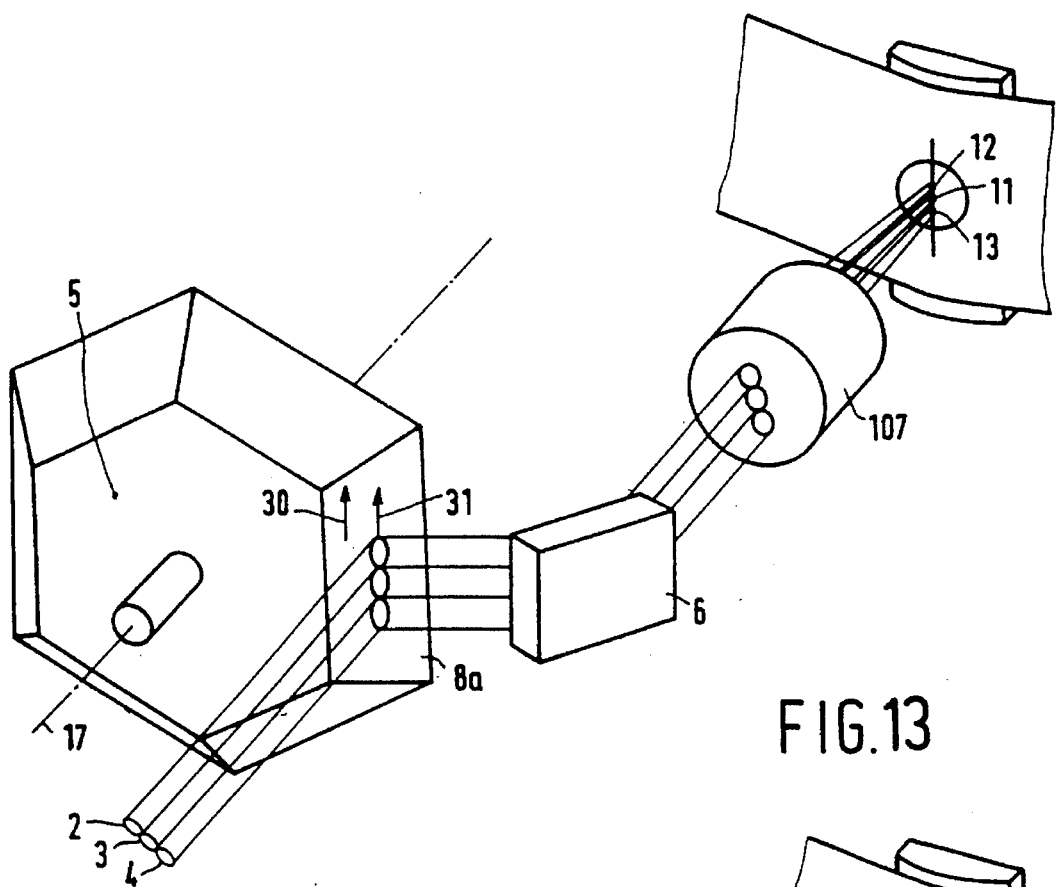

FIG. 13 shows a polygon mirror 5 in a position in which the radiation beams 2, 3 and 4 hit the facet 8a approximately in the middle. The spots where the radiation beams 2, 3 and 4 hit the mirror determine a direction indicated by an arrow 31. An arrow 30 indicates a direction of an intersecting line of a plane perpendicular to the axis of rotation 17 and the surface of the facet 8a.

Figure 14:
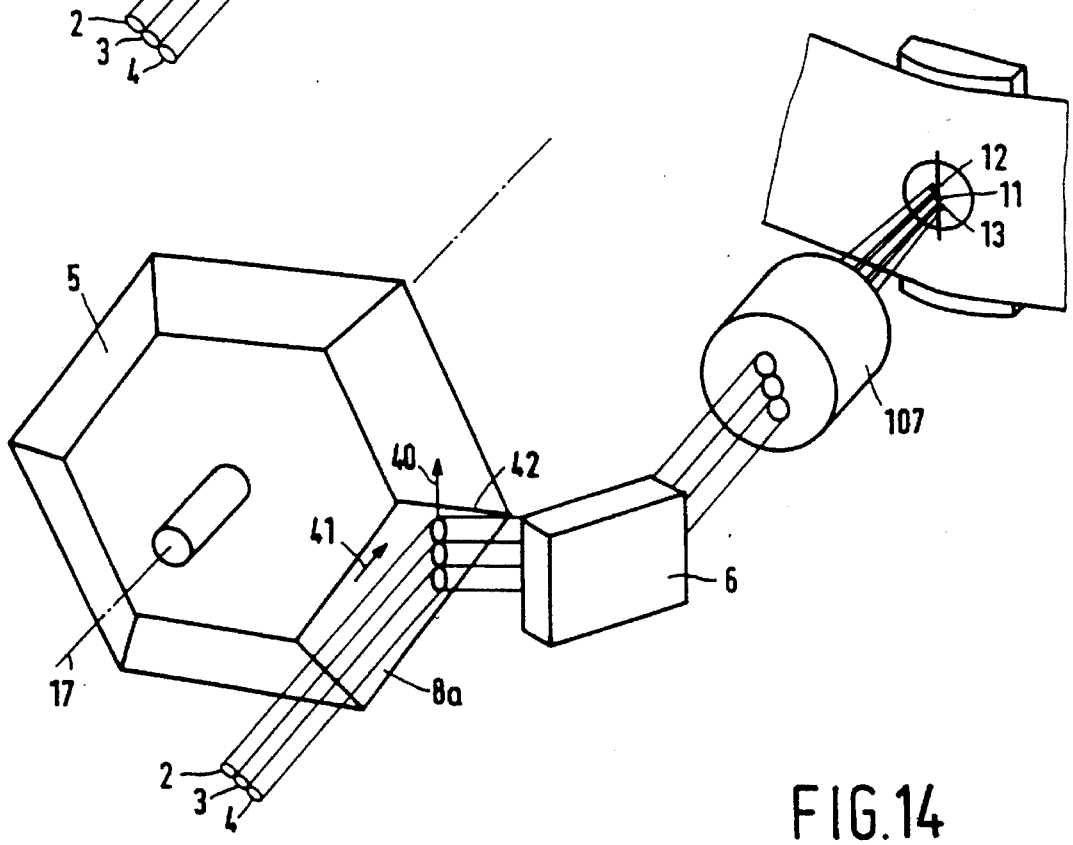

FIG. 14 shows the polygon mirror 5 in a position in which the radiation beams 2, 3 and 4 hit the facet 8a near an edge 42. In this position the spots where the radiation beams 2, 3 and 4 hit the facet determine a direction indicated by an arrow 40 which direction deviates from that of an intersecting line of a plane perpendicular to the axis of rotation and the plane of facet 8a indicated by arrow 41.

The mutual positions of the spots where the radiation beams hit the facet for the position of the polygon mirror 5 shown in FIG. 13 correspond to the positions of the scanning spots shown in FIG. 12 and referenced 11, 12 and 13. The positions of the scanning spots 11', 12' and 13' correspond to the situation shown in FIG. 14.

The mutual variations of the positions of the scanning spots result in displacements of the scanning spots 12 and 13 relative to the scanning spot 11 in a direction y transverse to the scanning path 16, the positions of the scanning spots 12 and 13 relative to the first scanning spot being related to the position of the polygon mirror 5 and thus to the location x of the first scanning spot 11 on the first scanning path 16.

In the embodiment described above, a deflecting element rotatable around an axis of rotation is used in the form of a polygon mirror 5 which has facets 8 forming an oblique angle to the axis of rotation 17 to obtain synchronous movements of the scanning spots 11, 12 and 13 in a way in which mutual displacements of the scanning spots 11, 12 and 13 in the direction y transverse to the scanning directions take place, and the position of the scanning spot 12 and scanning spot 13 relative to the scanning spot 11 is related to the location x of the scanning spot 11 on the first scanning path 16.

Such movements of the scanning spots, however, may also be obtained with different deflecting elements from a polygon mirror, which have facets forming an oblique angle to the axis of rotation. For a description of optional alternatives, reference is made to Belgian Patent Application No. 09301395, to which co-pending U.S. patent application No. 08/248,946 filed May 25, 1994 corresponds.

For realising tracks containing information patterns, the intensity of the radiation beam is generally determined to lie between a writing level sufficiently high to cause a change in the recording layer and a reading level that is not high enough to cause any effect. There should be observed that with magneto-optical recordings the effects may also be obtained by means of a magnetic field varying in strength, which is realised on the spot on the recording layer scanned by a radiation beam. The intensity of the radiation beams 2 and 4 have a level that is not high enough to cause optically detectable effects in the recording layer, so that undesired effects are avoided.

By way of illustration, FIG. 15a shows the way in which tracks 75 are obtained in this manner. The tracks 75 are further numbered $-7, \ldots, -1, 0$. The position along the scanning path 16 is indicated by a magnitude x, the associated position of the polygon mirror 5 is indicated by a magnitude phi which indicates in degrees the position of the facet used for the scanning relative to its central position. There is an unambiguous relation between the position of the polygon mirror 5 and the position x of the scanning spot 11 on the scanning path 16. The positions of the scanning spot which is caused by the radiation beam 3 for three different values of phi (phi=−θ1, phi=0 and phi=+θ1) are referenced 11', 11 and 11". The positions of the scanning spots which spots are caused by the radiation beams 2 and 4 are referenced 12' and 13', 12 and 13 and 12" and 13" for the three values of phi mentioned above. The scanning spot 11 moves along the path 16, whereas the scanning spots 12 and 13 move along the paths 18 and 19 intersecting path 16. When the scanning spot 11 is displaced from position $x=-x_1$ mm to x=0 mm, the scanning spot 12 passes a number of tracks, whereas the scanning spot 13 moves along a part of the recording layer in which no tracks 75 have yet been realised. When the scanning spot is displaced from position x=0 mm to $x=+x_1$ mm, the scanning spot 13 passes a number of tracks 75, whereas the scanning spot 12 moves along a part of the recording layer in which no tracks 75 have yet been made. At the locations where the scanning spots 12 and 13 coincide completely or in part with one of the tracks 75, the radiation reflected by the record carrier 109 will be modulated in accordance with the pattern of effects occurring in track 75, also termed information pattern. The degree of modulation corresponds to the degree to which the scanning spot coincides with the track 75. The recording device comprises detection systems of a type known per se for converting radiation coming from scanning spots 12 and 13 into a detection signal that corresponds to the reflected radiation modulation caused by the information pattern. In the embodiment shown in FIG. 11 reference characters 70 and 71 denote detection systems for converting radiation coming from scanning spots 12 and 13, which radiation returns to the lightwave 1 via the focusing objective 107, the reflecting mirror 6 and the polygon mirror 5.

The detection systems 70 and 71 may be of a general type and do not themselves form any part of the invention and are therefore represented only diagrammatically. Furthermore, the recording device shown in FIG. 11 includes means for generating a reference signal S3 which is indicative of the position of the first scanning spot 11 on the scanning path 16 as well as a measuring circuit 72 for deriving at least the measuring signal Vp from the detection signals S1 and S2 and the reference signal S3. The derivation of the measuring signals Vp will be explained hereinafter.

As already stated above, the scanning spots 11, 12 and 13 perform synchronous movements. Changes in the interspacing of the scanning spots seen in the direction y transverse to the direction of the scannings are related to the position of the polygon mirror 5 and hence related to the position of the scanning spot 11 on the first scanning path 16. The middles of the scanning spots 12 and 13 coincide for predetermined values of phi (x) with the middles of the previously formed tracks 75. The predetermined values of phi with which this takes place are independent of the distance from the scanning path 16 to the track 75 passed by the scanning spot (12 or 13). Since the spacing of the prerecorded tracks 75 has a constant value equal to the track pitch, the values of phi for which the middles of the scanning spots pass the middles of the tracks 75 depend on a distance dy between the scanning path 16 and the middle of the track 75 recorded last (track carrying track number −1 in FIG. 15a). This means that the maximum and minimum modulations of the detection signals occur with predetermined positions of the polygon mirror 5.

By way of illustration, FIG. 15b shows the detection signal S1 plotted against phi and against the position x for the case where the distance dy from the scanning path 16 to the middle of the adjacent track, indicated by line 80, corresponds to a desired track pitch. The detection signal S2 is plotted in FIG. 15c against phi for part of the scanning path 16 for the case where the distance dy corresponds to the desired track pitch. Furthermore, the envelopes S10 and S20 of the detection signals S1 and S2 are shown in FIGS. 5b and 5c. These envelopes S10 and S20 approximately have a sinusoidal behaviour which expresses the degree of modulation of the associated detection signals S1 and S2. The maximum values of each of the envelopes S10 and S20 denote the positions for which the modulations of the detection signal are largest. They are the positions in which the middle of the associated scanning spot coincides with the middle of one of the tracks. As shown in FIGS. 15b and 15c, there is a relation between the detection signals S1 and S2 and phi (and hence the position x). This relation depends on the distance dy. If this distance changes, the positions at which the maximum and minimum values of the envelopes S10 and S20 are found, will change. For that matter, the middles of the scanning spots 12 and 13 coincide with the middles of the tracks 75 with different positions x of the scanning spot 11. For example, when the distance dy is reduced, the position values at which the maximum values of the envelope S10 occur will undergo a change in negative direction (further to be referenced postcursing) and the position values at which the maximum and minimum values occur in the envelope S20 will undergo a change in positive direction (to be referenced precursing hereinafter). Conversely, when the distance dy is increased, the position values at which the maximum values of the envelope S10 occur will undergo a change in positive direction (precursing) and the position values at which the envelope S20 occurs will undergo a change in negative direction (postcursing). A deviation of the relation between the detection signals S1 and S2 relative to the relation belonging to a value of the distance equal to the desired track pitch is thus indicative of a difference between the distance dy and the desired track pitch. There should be observed that due to the symmetrical position of the scanning spots 12 and 13 relative to the scanning spot 11, the influence of a change of dy on the relation between the detection signal S1 and the position x is contrary to the influence on the relation between the detection signal S2 and the position x.

A deviation in the relation between the detection signals S1 and S2 and the reference signal S3 is measured by the measuring circuit.

The reference signal S3 may, for example, be a position signal whose signal value corresponds to the position of the deflecting element (polygon mirror in the embodiment shown) and thus by the position x of the scanning spot 11.

The reference signal S3 is obtained from a position detector 73. The position detector may be included in a control system for controlling the velocity and/or position of the polygon mirror 5. Driver circuits in which information signals are available which indicate the position of a driven object are widely known and will therefore not be described in detail.

Figure 16:
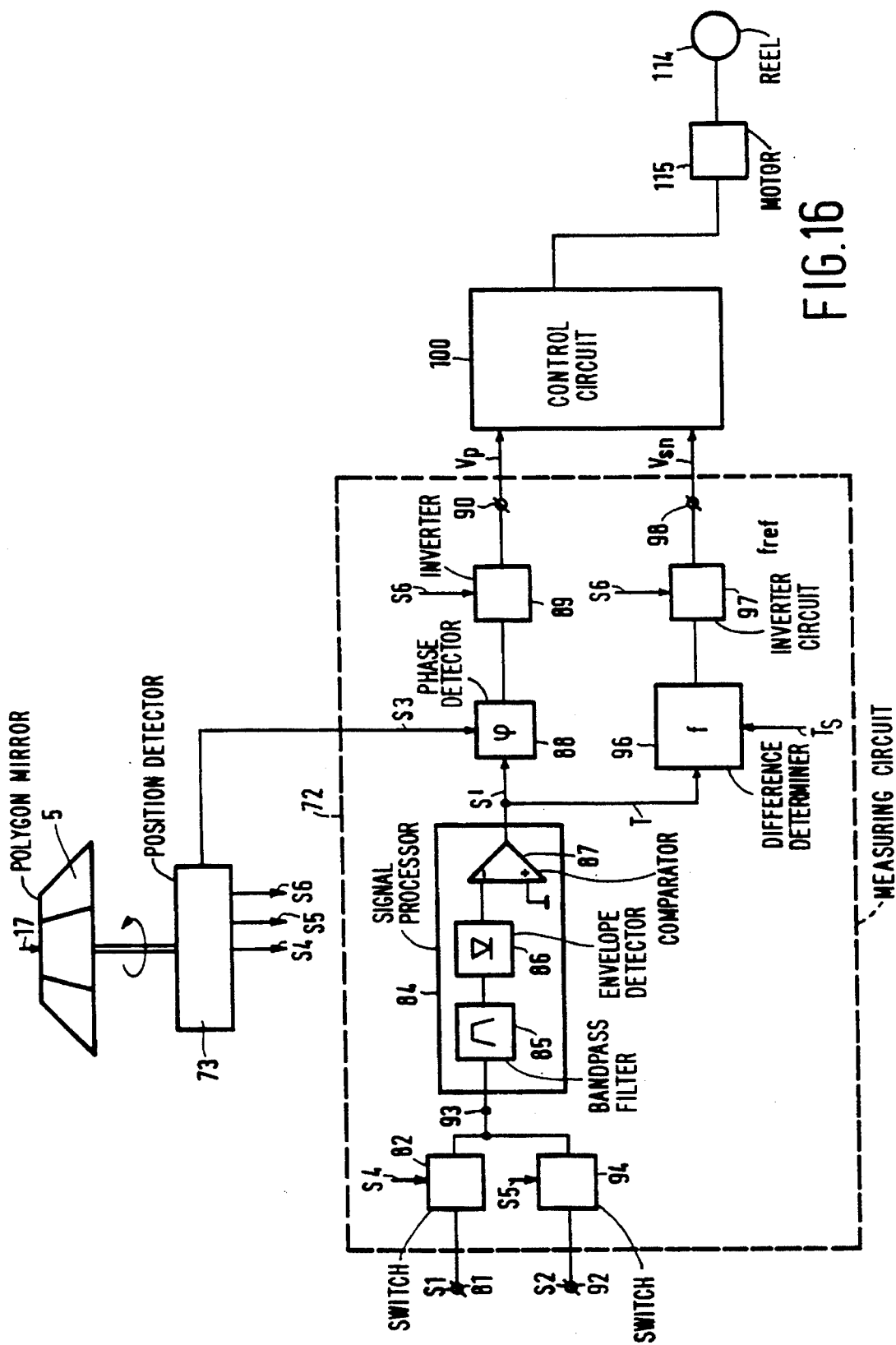
FIG. 16 shows an embodiment to be used in the embodiment shown in FIG. 11.

FIG. 16 shows an embodiment for the measuring circuit 72. The measuring circuit 72 has an input 81 for receiving the detection signal S1. The input 81 is connected by a switch 82 controlled by a signal S4 to an input 93 of a signal processor 84 which converts its received detection signal to a binary signal S' whose first logical value indicates that the scanning spot belonging to the detection signal is substantially located in one of the tracks 75 and whose second logical value indicates that the corresponding scanning spot is substantially located between two tracks 75. The signal processor 84 may be of a customary type also referenced track loss detector. Such a track loss detector may comprise, for example, a series combination of a bandpass filter 85, an envelope detector 86 and a comparator 87.

The signal S' is available on an output of the circuit 84 and is applied to a phase detector 88. By way of illustration the signal S' in FIG. 15d is shown as a function of phi. An output of the phase detector 88 is connected to an output 90 of the measuring circuit 72 via an inverter circuit 89 controlled by a signal S6. The measuring circuit 72 further has an input 92 for receiving the detection signal S2. The input 92 is connected to an input 93 of the circuit 84 via a switch 94 controlled by a signal S5.

The phase detector 88 is further supplied with a signal S3 which in this embodiment is pulse-shaped and whose edges indicate the positions at which the maximum and minimum values in the detection signals are to occur.

By way of illustration, FIG. 15e shows the reference signal S3 as a function of the position phi. Furthermore, FIGS. 15f, 15g and 15h show the respective signals S4, S5 and S6.

Signal S4 has a logical "1" value for $0<\text{phi}<\theta 1$. For these values of phi the scanning spot 12 is located in a part of the recording layer on which tracks 75 have already been realised and the detection signal S1 shows a modulation caused by these tracks 75.

The signal S5 has a logical "1" value for $-\theta 1<\text{phi}<0$. For these values of phi the scanning spot 13 is located in a part of the recording layer in which tracks 75 have already been made and the detection signal S2 shows a modulation caused by these tracks 75.

The signal S6 has a logical "1" value for $-30<\text{phi}<0$. The edge (signal level transition) for the value of phi=0 indicates the boundary between the section in which the scanning spot 12 is located in the track area 75.

The signals S3, S4, S5 and S6 may be generated in customary fashion by the position detector 73. Such a position detector 73 may for this purpose be coupled to a spindle of the polygon mirror 5. Such a position detector coupled to the spindle of the polygon mirror 5 may comprise a so-called pulse disc, possibly in combination with counting circuits. Such position detectors may be known per se and do not form part of the invention and, therefore, will not be described in detail.

The operation of the measuring circuit 72 will be further explained hereinbelow. The polygon mirror 5 is driven with a constant angle velocity, so that the value of phi (indicating the position of the facet used for the deflection) is constantly varying in a range from −30 to 30 degrees. In the sub-range $\theta<\text{phi}<0$ the detection signal S2 will be passed to circuit 84 via the switch 94 controlled by signal S5. The phase difference between the reference signal S3 and the signal S' derived from the detection signal S2 is determined by a phase detector 88. This phase difference is 90 degrees (see FIG. 15) for the desired value of dy. The phase detector 88 is of a type producing a phase difference signal whose (average) signal strength is proportional to the phase difference between the signals S' and S3 minus 90 degrees and thus the sign of the (average) signal strength indicates the direction of the deviation of dy relative to the desired track pitch. In a simple form such a phase detector may comprise a so-called EXCLUSIVE-OR-circuit. However, lots of different types of phase detectors can be used. The phase difference signal thus obtained, which is a measure for the deviation of dy, is applied unaltered to the output 90 of the measuring circuit 72 via the controllable inverter circuit 89.

The moment the polygon mirror passes the position phi=0, the detection signal S2 is blocked by the switch 94 and the detection signal S1 is passed to the input 93 of the circuit 84 via the switch S4 controlled by signal S4. The phase detector 88 detects the phase difference between the reference signal S3 and the signal S' obtained in response to the detection signal S1. As observed earlier, the effect of dy on the detection signal S1 is contrary to the effect of dy on the detection signal S2. A correction of this is made by the inverter circuit 89 controlled by the signal S6. For that matter, the moment (phi=0) at which the detection signal S2 on the input 93 is replaced by the detection signal S1, the inverter circuit 89 is activated leading to an inversion of the phase difference signal available on output 90.

The period T of the signal S' indicates the time difference between two successive track transitions by either scanning spot 12 or 13.

If the scanning spot 11 used for recording has a component of movement in the direction y transverse to the tracks 75, this will result in a change of the value T relative to the value Ts which belongs to a situation in which the position of the scanning spot in the direction transverse to the tracks 75 does not change (constant value of dy). The difference between the real value of T and Ts thus indicates the deviation of velocity of the scanning spot 11 in the direction y transverse to the tracks 75. There should again be observed in this context that the influence of the velocity on the phase of the periodic detection signal S1 is contrary to the influence of the velocity on the phase of the periodic detection signal S2. For determining the difference between the period T of the signal S', the measuring circuit 72 may comprise a circuit 96 of a type known per se. Circuit 96 may comprise, for example, a timer for determining the length of the period T, and a subtracter for determining the difference between the values found for T and Ts. Via an inverter circuit 97 controlled by signal S6, the circuit 96 passes a difference signal which carries a sign corresponding to the sign of the difference found to an output 98. The inverter circuit 97 controlled by signal S6 is used for correcting the difference between the influence of velocity of the scanning spot 11 on the signals S1 and S2. Hereinbefore, the period of the detection signals is determined for determining a measure for the velocity of the scanning spot. It will be obvious to a person skilled in the art that for obtaining a measure for the velocity of the scanning spot 11, a different signal may be derived which is related to the period of the signal S', for example, a signal indicating the frequency of the signal S'.

The signal on the output 90 functions as the measuring signal Vp and is indicative of the deviation of the instantaneous track pitch relative to a desired track pitch. The signal on the output 98 is indicative of the velocity of the scanning spot in the direction y transverse to the tracks 75. This signal will in the following be referenced measuring signal Vsn. The measuring signal Vp, possibly in combination with the measuring signal Vsn, can be used for controlling the velocity of the record carrier 109 to a value for which the track pitch assumes the desired value.

This may be effected, for example, by adapting the velocity with which the means of displacement (reel 114 and motor 115 in FIG. 1) move in response to a control signal derived by a control circuit 100 from the measuring signal Vp possibly in combination with the measuring signal Vsn.

The bandwidth of such a control will generally be limited due to the inertia of the driving means (reel 114 and motor 115), so that with such a control a compensation can only be made for low-frequency deviations of dy. However, in the case of the scanning repetition rate fh selected here, a tuning to eliminate the high-frequency deviations may be omitted.

Although it is advantageous to control the scanning spot and thus the track pitch in response to both the measuring signal Vp and the velocity signal Vsn, this is not necessary. For example, it is possible to control this position only in response to the measuring signal Vp.

We claim:

1. A device for scanning a layer of a medium in accordance with a track pattern formed by a longitudinal path of substantially parallel tracks which have a substantially constant track pitch and have a track direction transverse to the longitudinal direction of the path, the device comprising an optical system for focusing a radiation beam at the layer, which radiation beam causes a scanning spot to develop on the layer, scanning means for causing the scanning spot to be displaced with a specific repetition rate over the layer along a scanning path that has a specific scanning direction, driver means for causing the medium to be displaced relative to the scanning means with a certain velocity in a direction transverse to the scanning direction, in which device, when operative, vibrations occur which cause the scanning spot to be displaced over the layer in a direction transverse to the scanning direction, which displacements of the scanning spot have an amplitude that exceeds the track pitch, wherein the relation between velocity and repetition rate is selected such that the amplitude of the displacements of the scanning spot, which displacements have a frequency exceeding the repetition rate, is smaller than the track pitch.

2. The device as claimed in claim 1, wherein the amplitude of the displacements of the scanning spot is less than 20% of the track pitch.

3. The device as claimed in claim 1, wherein the device further comprises control means for controlling the velocity in response to a measuring signal.

4. The device as claimed in claim 1, for realising an optically detectable track pattern corresponding to the scanning path in a recording layer of the medium, wherein the device further comprises opto-electrical measuring means for deriving from the track pattern a measuring signal indicative of the spacing of successively realised tracks.

5. The device as claimed in claim 4, wherein the electro-optical measuring means comprises an optical system for focusing a radiation beam at the track pattern, the track pattern converting the incoming radiation beam into a zero$^{th}$ order beam and first-order beams, and detection means for deriving as the measuring signal a detection signal that is indicative of the angle between the zero$^{th}$ order beam and one of the first-order beams.

6. The device as claimed in claim 4, wherein the optical system comprises means for focusing a satellite beam together with aforesaid scanning beam at the recording layer, the satellite beam causing a satellite scanning spot on the recording layer, which spot is located at a predefined position relative to the former scanning spot, and the electro-optical measuring means comprises a detection system for deriving the measuring signal based upon the radiation coming from the satellite scanning spot.

7. The device as claimed in claim 6, further comprising an actuator that intervenes in the optical system and causes the scanning spots to be displaced in a direction transverse to the tracks within a predefined range of displacement, signal generating means for generating a position signal which is indicative of the position of the scanning spots in the scanned area, and control means which may be brought to a first and a second state and which, in the first state, causes the velocity to be controlled in response to the measuring signal and, in the second state, causes the actuator to be controlled in response to the measuring signal and the velocity to be controlled in response to the position signal.

8. The device as claimed in claim 2, wherein the device further comprises control means for controlling the velocity in response to a measuring signal.

9. The device as claimed in claim 8, for realising an optically detectable track pattern corresponding to the scanning path in a recording layer of the medium, wherein the device further comprises opto-electrical measuring means for deriving from the track pattern a measuring signal indicative of the spacing of successively realised tracks.

10. The device as calimed in claim 9, wherein the electro-optical measuring means comprieses an optical system for focusing a radiation beam at the track pattern, the track pattern converting the incoming radiation beam into a $zero^{th}$ order beam and first-order beams, and detectiong means for deriving as the measuring signal a detection signal that is indicative of the anble between the $zero^{th}$ order beam and one of the first-order beams.

11. The device as claimed in claim 9, wherein the optical system comprises means for focusing a satellite beam together with aforesaid scanning beam at the recording layer, the satellite beam causing a satellite scanning spot on the recording layer, which spot is located at a predefined position relative to the former scanning spot, and the electro-optical measuring means comprises a detection system for deriving the measuring signal based upon the radiation coming from the satellite scanning spot.

12. The device as claimed in claim 11, further comprising an actuator that intervenes in the optical system and causes the scanning spots to be displaced in a direction transverse to the tracks within a predefined range of displacement, signal generating means for generating a position signal which is indicative of the position of the scanning spots in the scanned area, and control means which may be brought to a first and a second state and which, in the first state, causes the velocity to be controlled in response to the measuring signal and, in the second state, causes the actuator to be controlled in response to the measuring signal and the velocity to be controlled in response to the position signal.

13. The device as claimed in claim 2, for realising an optically detectable track pattern corresponding to the scanning path in a recording layer of the medium, wherein the device further comprises opto-electrical measuring means for deriving from the track pattern a measuring signal indicative of the spacing of successively realised tracks.

14. The device as calimed in claim 13, wherein the electro-optical measuring means comprieses an optical system for focusing a radiation beam at the track pattern, the track pattern converting the incoming radiation beam into a $zero^{th}$ order beam and first-order beams, and detectiong means for deriving as the measuring signal a detection signal that is indicative of the anble between the $zero^{th}$ order beam and one of the first-order beams.

15. The device as claimed in claim 13, wherein the optical system comprises means for focusing a satellite beam together with aforesaid scanning beam at the recording layer, the satellite beam causing a satellite scanning spot on the recording layer, which spot is located at a predefined position relative to the former scanning spot, and the electro-optical measuring means comprises a detection system for deriving the measuring signal based upon the radiation coming from the satellite scanning spot.

16. The device as claimed in claim 15, further comprising an actuator that intervenes in the optical system and causes the scanning spots to be displaced in a direction transverse to the tracks within a predefined range of displacement, signal generating means for generating a position signal which is indicative of the position of the scanning spots in the scanned area, and control means which may be brought to a first and a second state and which, in the first state, causes the velocity to be controlled in response to the measuring signal and, in the second state, causes the actuator to be controlled in response to the measuring signal and the velocity to be controlled in response to the position signal.

17. The device as claimed in claim 3, for realising an optically detectable track pattern corresponding to the scanning path in a recording layer of the medium, wherein the device further comprises opto-electrical measuring means for deriving from the track pattern a measuring signal indicative of the spacing of successively realised tracks.

18. The device as calimed in claim 17, wherein the electro-optical measuring means comprieses an optical system for focusing a radiation beam at the track pattern, the track pattern converting the incoming radiation beam into a $zero^{th}$ order beam and first-order beams, and detectiong means for deriving as the measuring signal a detection signal that is indicative of the anble between the $zero^{th}$ order beam and one of the first-order beams.

19. The device as claimed in claim 17, wherein the optical system comprises means for focusing a satellite beam together with aforesaid scanning beam at the recording layer, the satellite beam causing a satellite scanning spot on the recording layer, which spot is located at a predefined position relative to the former scanning spot, and the electro-optical measuring means comprises a detection system for deriving the measuring signal based upon the radiation coming from the satellite scanning spot.

20. The device as claimed in claim 19, further comprising an actuator that intervenes in the optical system and causes the scanning spots to be displaced in a direction transverse to the tracks within a predefined range of displacement, signal generating means for generating a position signal which is indicative of the position of the scanning spots in the scanned area, and control means which may be brought to a first and a second state and which, in the first state, causes the velocity to be controlled in response to the measuring signal and, in the second state, causes the actuator to be controlled in response to the measuring signal and the velocity to be controlled in response to the position signal.

* * * * *